US010783886B2

(12) United States Patent
Bender et al.

(10) Patent No.: US 10,783,886 B2
(45) Date of Patent: Sep. 22, 2020

(54) COGNITIVE AGENT DISAMBIGUATION

(71) Applicant: International Business Machines Corporation, Armonk, NY (US)

(72) Inventors: Michael Bender, Rye Brook, NY (US); Rick A. Hamilton, II, Charlottesville, VA (US); Kulvir S. Bhogal, Fort Worth, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/006,153

(22) Filed: Jun. 12, 2018

(65) Prior Publication Data
US 2019/0378504 A1 Dec. 12, 2019

(51) Int. Cl.
*G10L 15/00* (2013.01)
*G10L 15/22* (2006.01)
*G10L 15/28* (2013.01)
*G06K 19/07* (2006.01)

(52) U.S. Cl.
CPC .......... *G10L 15/22* (2013.01); *G06K 19/0723* (2013.01); *G10L 15/28* (2013.01); *G10L 2015/223* (2013.01)

(58) Field of Classification Search
CPC .................................................. G10L 15/00
USPC ................ 704/275, 270, 257; 709/225, 206; 705/7.42; 370/503, 352
See application file for complete search history.

(56) References Cited

U.S. PATENT DOCUMENTS

| 6,611,537 B1 * | 8/2003 | Edens | H04L 12/2803 348/E7.05 |
| 8,340,975 B1 * | 12/2012 | Rosenberger | G10L 15/22 704/270 |
| 10,277,981 B1 * | 4/2019 | Frank | G10L 15/22 |
| 10,299,061 B1 * | 5/2019 | Sheen | H04S 7/301 |

(Continued)

FOREIGN PATENT DOCUMENTS

| WO | WO 2016085776 | 6/2016 |
| WO | WO 2017213681 | 12/2017 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Michael Colucci
(74) *Attorney, Agent, or Firm* — Heslin Rothenberg Farley & Mesiti P.C.; Michael Petrocelli, Esq.

(57) ABSTRACT

A method, computer program product, and a system where a processor(s) continuously obtains, from devices in a group of devices within a defined geographic proximity to each other, processing requests. Each request is a result of a device in the group of devices receiving and interpreting a voice command issued within a geographic area comprising the group of devices. The processor(s) buffers, in a memory resource, a portion of the processing requests obtained within a defined time interval. The processor(s) determines there are duplicate processing requests in the portion. Based on determining there are duplicates, the processor(s) rejects the duplicates. The processor(s) selects a specific device to execute each processing request from the devices where the request and the duplicates of that request originated. The processor(s) utilize the specific device to execute the processing request.

20 Claims, 6 Drawing Sheets

(56) References Cited

U.S. PATENT DOCUMENTS

| | | | |
|---|---|---|---|
| 10,461,710 B1* | 10/2019 | Charlton | H04N 21/4825 |
| 2003/0187659 A1* | 10/2003 | Cho | H04L 12/2803 |
| | | | 704/275 |
| 2011/0182283 A1* | 7/2011 | Van Buren | H04M 7/0075 |
| | | | 370/352 |
| 2013/0198298 A1* | 8/2013 | Li | H04N 21/4307 |
| | | | 709/206 |
| 2013/0339105 A1* | 12/2013 | Russell | G09B 19/04 |
| | | | 705/7.42 |
| 2014/0280933 A1* | 9/2014 | Oswald | H04L 67/18 |
| | | | 709/225 |
| 2015/0039319 A1* | 2/2015 | Mei | G10L 15/1822 |
| | | | 704/275 |
| 2016/0217790 A1* | 7/2016 | Sharifi | G10L 17/22 |
| 2017/0006051 A1 | 1/2017 | Gould et al. | |
| 2017/0180899 A1* | 6/2017 | Proctor, Jr. | H04W 4/80 |
| 2017/0236514 A1* | 8/2017 | Nelson | G10L 15/22 |
| | | | 704/257 |
| 2017/0251328 A1* | 8/2017 | Klein | H04W 8/186 |
| 2017/0311341 A1* | 10/2017 | Patil | H04W 68/02 |
| 2018/0270290 A1* | 9/2018 | Sinha | H04L 67/025 |

\* cited by examiner

COGNITIVE AGENT DISAMBIGUATION

BACKGROUND

More and more households employ voice-activated computing resources, including but not limited to Internet of Things (IoT) devices, to assist individuals within the households. For example, an individual may utilize voice commands to various devices to complete various activities, including but not limited to, checking the weather, creating or updating a shopping list, providing background music for an event or activity, viewing live footage of various areas of the household for security purposes, tracking biometrics for one or more individuals within the household, and/or accessing pre-recorded or live media. In order to provide this functionality, the device in a given home may always be in a listening mode and a given device may be in close enough proximity to another device, that the first device may receive and attempt to process a voice command intended for the other device. The command may also be received by both devices. Attempts by devices that were not the intended target of vocal commands to process these commands not only can provide a problematic user experience, but can also impact the overall efficiency of the network in a given household, by requiring resources for unnecessary processing tasks. However, space concerns may render it impossible to separate devices such that each device will only "hear" (and therefore, process) the commands intended for that device.

SUMMARY

Shortcomings of the prior art are overcome and additional advantages are provided through the provision of a method for cognitive agent disambiguation. The method includes, for instance: continuously obtaining, by one or more processors, from devices in a group of devices within a defined geographic proximity to each other, wherein the devices are communicatively coupled to the one or more processors, processing requests, wherein each of the processing requests is a result of a device in the group of devices receiving and interpreting a voice command issued within a geographic area comprising the group of devices; buffering, by the one or more processors, in a memory resource communicatively coupled to the one or more processors, a portion of the processing requests obtained by the one or more processors, wherein the portion was obtained within a defined time interval; determining, by the one or more processors, based on analyzing each processing request in the portion, whether one or more processing requests in the portion are duplicative of each other; based on determining that the portion comprises one or more processing requests and one or more duplicate processing requests of the one or more processing requests, rejecting, by the or more processors, the one or more duplicate processing requests; for each processing request of the one or more processing requests, selecting, from a sub-set of the devices, wherein the subset-set comprises devices in the group that originated processing requests comprising the portion, a specific device to execute the processing request; and for each processing request of the one or more processing requests, utilizing, by the one or more processors, the specific device to execute the processing request.

Shortcomings of the prior art are overcome and additional advantages are provided through the provision of a computer program product for cognitive agent disambiguation. The computer program product comprises a storage medium readable by a processing circuit and storing instructions for execution by the processing circuit for performing a method. The method includes, for instance: continuously obtaining, by the one or more processors, from devices in a group of devices within a defined geographic proximity to each other, wherein the devices are communicatively coupled to the one or more processors, processing requests, wherein each of the processing requests is a result of a device in the group of devices receiving and interpreting a voice command issued within a geographic area comprising the group of devices; buffering, by the one or more processors, in a memory resource communicatively coupled to the one or more processors, a portion of the processing requests obtained by the one or more processors, wherein the portion was obtained within a defined time interval; determining, by the one or more processors, based on analyzing each processing request in the portion, whether one or more processing requests in the portion are duplicative of each other; based on determining that the portion comprises one or more processing requests and one or more duplicate processing requests of the one or more processing requests, rejecting, by the or more processors, the one or more duplicate processing requests; for each processing request of the one or more processing requests, selecting, from a sub-set of the devices, wherein the subset-set comprises devices in the group that originated processing requests comprising the portion, a specific device to execute the processing request; and for each processing request of the one or more processing requests, utilizing, by the one or more processors, the specific device to execute the processing request.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
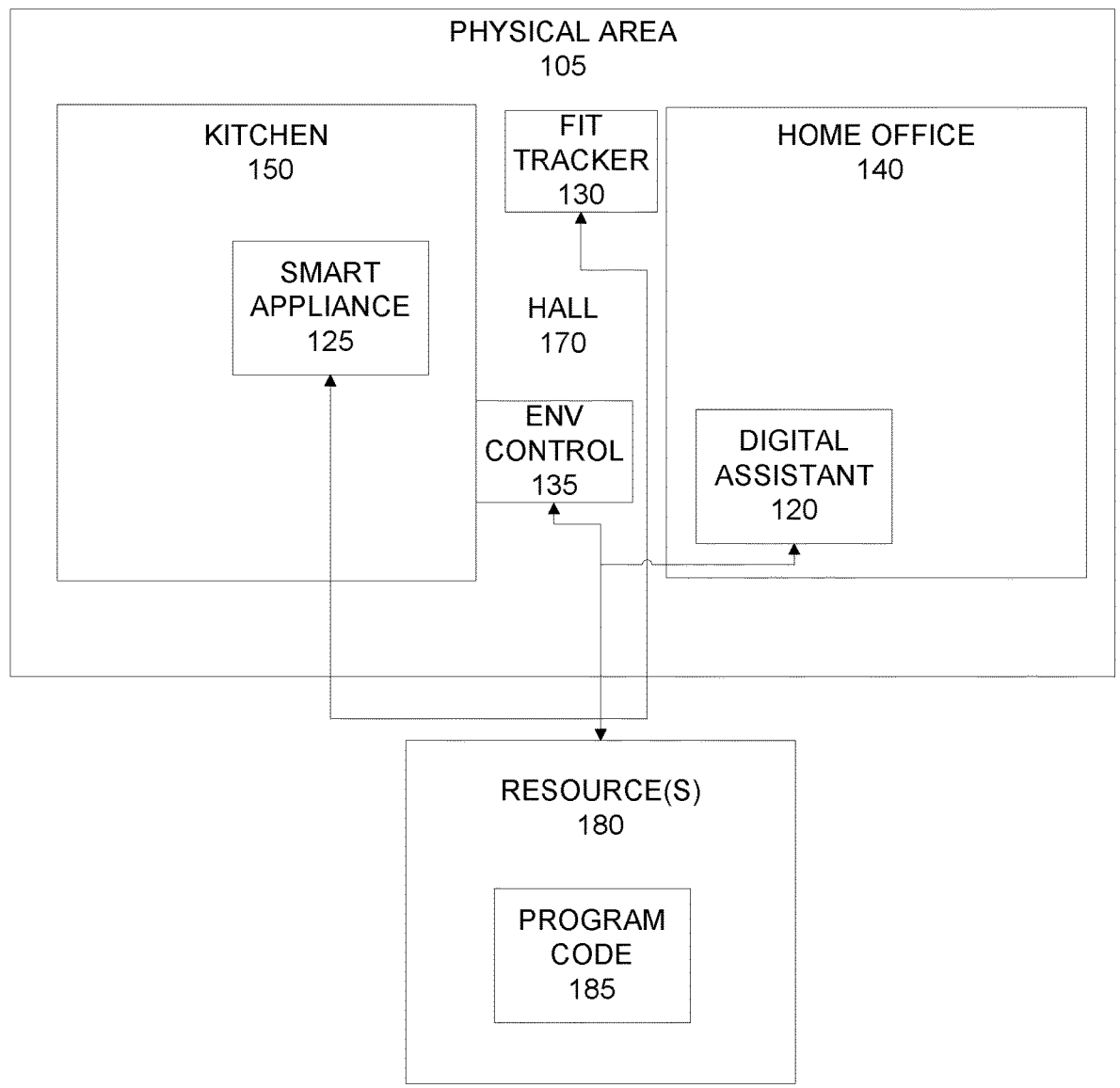
FIG. 1 is an illustration of various aspects of an environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
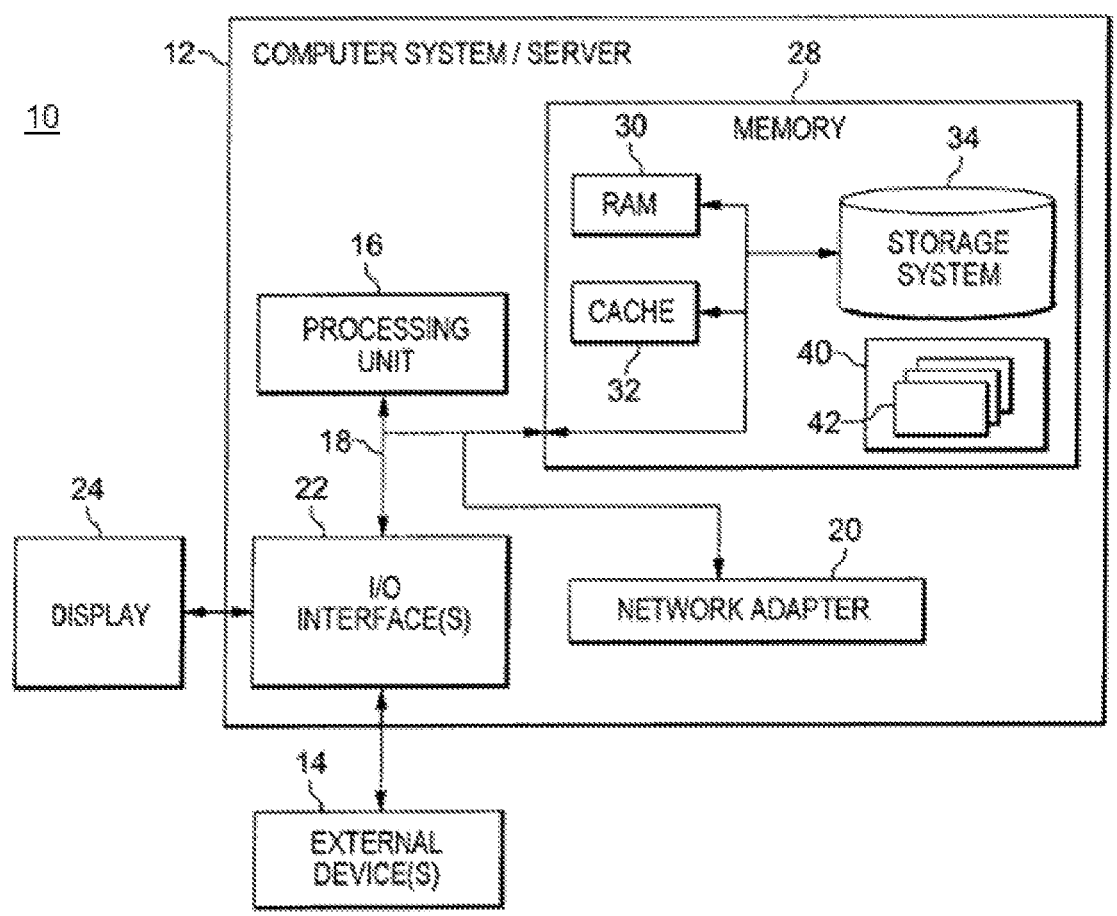
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include a computer-implemented method, a computer program product, and a computer system that include program code that assesses a voice command at a point of execution, in a distributed and/or shared computing environment, including but not limited to, a cloud computing environment, and determines which computing device (i.e., resource), of the devices within a given area, should execute the voice command. To determine which device should execute the voice command, in some embodiments of the present invention, the program code will apply various criteria, including, but not limited to, determining which device within the area captured the command first. By determining which device will execute the voice command, the program code enables the distributed and/or shared computing environment to avoid duplication. In some embodiments of the present invention, the program code: 1) captures a verbal commands in an area; 2) determines a specific device within the area will execute the command using a given criteria; 3) selects or accesses the specific device; and 4) executes the command utilizing the specific device. In some embodiments of the present invention, the program code determines which device will execute the command by buffering the distributed and/or shared (e.g., cloud computing) environment and utilizing control logic to assess the command to determine which device will execute the command. For example, when the program code in an embodiment of the present invention uses the given criteria, as noted above, the program code may determine which device captured the command first or which device executing the command would avoid duplication.

In some embodiments of the present invention, the devices that receive voice commands, from which the program code designates a single device to process a given command, include Internet of Things (IoT) devices, As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. IoT devices also include Smart home devices, digital assistants, and home entertainment devices. Because the smart sensors in IoT devices carry unique identifiers, a computing system that communicates with a given sensor can identify the source of the information. Within the IoT, various devices can communicate with each other and can access data from sources available over various communication networks, including the Internet. Many of these IoT devices receive inputs from voice commands. Utilizing voice inputs, rather than text, allows for the miniaturization of these devices as no physical keyboard need be included.

Embodiments of the present invention are inextricably tied to computing because they improve the efficiency of resources in a given computing environment. Duplication of effort is inefficient and embodiments of the present invention address this inefficiency. First, in one aspect of some embodiments of the present invention, program code (executing on a computing resource) prevents a single request (i.e., voice command) from being performed multiple times by implementing a hand shake between devices in a shared physical environment. Second, in another aspect of some embodiments of the present invention, the program code prevents a single request from being performed multiple times by ignoring duplicative requests in the distributed and/or shared environment. The program code eliminates these duplicates by receiving commands from the requesting devices (i.e., different always on listening devices), buffering the requests, comparing the requests, identifying a redundant command among the requests, selecting a single device to execute the command, once, and ignoring the duplicate of the command. Additionally, embodiments of the present invention are inextricably tied to computing at least because the communications of the devices with each other and with one or more resources that determines which device will execute a command and eliminates duplication, are enabled by the interconnectivity of the distributed systems. The devices are IoT devices and the one or more resources are communicatively coupled to all competing devices in a given physical because of the IoT.

Embodiments of the present invention provide advantages over existing systems of selecting a device for executing a voice command, when more than one device is potentially available, at least because embodiments of the current system are operable in a dynamic computing environment. The portability of IoT devices means that the devices in a given area of a physical household can change, for example, as guests wearing fitness trackers enter the premises. Thus, a need exists to target, reliably, voice commands to an intended or otherwise correct (for executing the command) recipient device, when the given devices within range of a voice command are a dynamic group. Thus, aspects of some embodiments of the present invention enable program code executing on at least one processing resource in a distributed and/or shared computing environment to differentiate a device from the group of devices for execution of a given voice command, without requiring the imposition of conformity or static limitations upon the group. One reason that aspects of embodiments of the present invention can operate in a dynamic environment is because the program code automatically provides special awareness to the competing devices in a given space, to assist the process code in determining which device should execute a given command. Despite the changing nature of the devices in a space, in embodiments of the present invention, program code can determine a target device for a voice command issued by a given user, when multiple devices in the space are configured to respond to vocal commands from this user.

Various aspects of some embodiments of the present invention provide additional advantages over existing techniques for targeting commands to specific computing devices in a computing environment that includes more than one device. For example, embodiments of the present invention provide differentiation that may be specific to targeting voice commands to specific devices that receive this type of input, in a distributed and/or shared environment, including but not limited to, a cloud computing environment. The program code in embodiments of the present invention determines which device will execute a command without requiring manual inputs by a user, beyond the initial voice command, through a traditional input device, such as a keyboard. Thus, some embodiments of the present invention can operate in an entirely hands-free computing environment.

FIG. 1 is an illustration of an environment into 100 which aspects of the present invention may be implemented. The environment 100 includes a physical area 105 that includes four IoT devices, which include a first IoT device 120, a second IoT device 125, a third IoT device 130, and a fourth IoT device 135, within a proximity to each other where a given user 140 could issue a voice command that could be received by more than one of the IoT devices. In this example, four devices 120, 125, 130, 135 are depicted for simplicity of illustration. As understood by one of skill in the art, the aspects of embodiments of the present invention illustrated in FIG. 1 are operable in environments with an unlimited and dynamic number and type of devices.

As illustrated in FIG. 1, in a physical area 105, having multiple IoT devices within a range where more than one device can receive a vocal command, is not uncommon. In this physical area 105, the first IoT device 120 is in a home office 140 and is a personal digital assistant. The second IoT device 125 is a stationary IoT device, in the kitchen 150, specifically, a smart appliance. The third IoT device 130 is carried by the user and is a personal fitness tracker, who is standing in the hallway 170. The fourth IoT device 135 is also in the hallway 170 and is an environmental control device. Provided that these rooms are only separated by the hallway 170, the vocal commands that a user standing in the hallway 170 issues, depending on the user's location and the direction in which the commands are issued, could be received by more than one of the IoT devices 120 125 130 135. The examples and locations are this devices are offered to illustrate various aspects of the embodiments of the present invention and utilized in examples discussed below and are not meant to impose any limitations on the number or types of IoT devices in a physical environment, in which aspects of the present invention may be implemented.

Various aspects of the embodiments of present invention will be described in reference to scenarios that may occur within the physical area 105. These examples illustrate various aspects of embodiments of the present invention and how these aspects improve the functionality of the IoT devices within the physical area 105. The improvements are experienced because program code 185 in embodiments of the present invention eliminate unnecessary duplication of the execution of processes requested by vocal commands of the user. In FIG. 1, the program code 185 is executed by one or more resources 180 of a shared computing environment, such as one or more computing resources of a cloud computing environment. The one or more resources 180 may be external and/or internal to the physical area 105. The one or more resources 180 communicate with the IoT devices 120 125 130 135 in the physical area 105 via a wireless (e.g., Internet) connection.

In a one non-limiting example illustrating various aspects of some embodiments of the present invention within the physical area 105, a user issues a voice command intended for the first IoT device 120, a personal digital assistant, to place an electronic request for a car service (e.g., Uber, Lyft, etc.). Based on the position of the user within the physical area 105, this voice command is received by the first IoT device 120 and the second IoT device 125, at approximately the same time. Responsive to receiving these commands, the first IoT device 120 and the second IoT device 125 forward the requests associated with the commands to the one or more resources 180. Program code 185 executed by one or more processors (not pictured) of the one or more resources 180 obtains the requests from the first IoT device 120 and the second IoT device 125.

A request is understood in this context as the substance of the voice command, i.e., the process the speaker who speaks the voice command hopes to initiate. Thus, depending on how each IoT device receives and interprets the voice command, the IoT will communicate the substance of the commands to the one or more resources 180, rather than speak these commands to the one or more resources 180.

As there may be a slight difference in when the program code 185 obtains each request, upon receipt on the first request (e.g., from one of: the first IoT device 120, or the second IoT device 125), the program code 185 buffers this first request to allow for the receipt of any subsequent similar requests (e.g., from one of: the first IoT device 120, or the second IoT device 125). The program code 185 buffers all requests received within a given pre-defined interval (e.g., seconds and/or milliseconds, such that any lag created by the buffering is not perceived by the user). The program code 185 compares all requests received within the buffering interval, which would include the requests from one of: the first IoT device 120 or the second IoT device 125. The program code 185 determines, based on comparing, whether there are any duplicates among the requests received during the buffering interval. Based in determining that the requests from the first IoT device 120 and the second IoT device 125 are duplicative of each other, the program code 185 enables only one of the requests to proceed, executing the request on one of the first IoT device 120 or the second IoT device 125. One of the first IoT device 120 or the second IoT device 125 places the electronic request for the car service. In some embodiments of the present invention, the program code 185 determines that the first IoT device 120 is more suited to process the command and will therefore determine that the first IoT device 120 was the intended target and enable the first IoT device 120, rather than the second IoT device 125, to execute the request.

Thus, in this first example, the program code 185: 1) buffers duplicates of a command (i.e., requests) so that they are not executed by multiple IoT devices (e.g., the first IoT device 120, and/or the second IoT device 125) upon receipt by the IoT devices; and 2) once the buffering period (a small delay) has lapsed, the program code 185 determines which singular IoT device should execute the command. Thus, the program code 185 prevents duplicative execution of the same commands by more than one IoT device (e.g., the first IoT device 120, and/or the second IoT device 125) in a given physical area 105. In some embodiments of the present invention, the program code 185 resides in a resource of a cloud computing system, and the IoT devices are all communicatively coupled to the cloud computing system.

In a second non-limiting example, a user, again, issues a voice command intended for the first IoT device 120, a personal digital assistant, to place an electronic request for a car service (e.g., Uber, Lyft, etc.). As before, based on the position of the user within the physical area 105, this voice command is received by the first IoT device 120 and the second IoT device 125, at approximately the same time. Responsive to receiving these commands, the first IoT device 120 and the second IoT device 125 communicate with each other, utilizing the connection through the one or more resources 180 (e.g., of the shared or cloud computing environment), as initiated by the program code 185, the IoT devices 120 125 communicate with each other (i.e., performing a handshake), such that the command is only executed by one of the devices. Based on this communication, the IoT devices 120 125 perceive the commonality of the request received by each device, separately, (at approximately the same time from the same voice command) and the request associated with the command, placing the request for the car service, is only executed one time. Thus, the program code 185 executing on the one or more resources 180 manages the handshake between the IoT devices 120 125 to avoid duplication of the commands.

In a third non-limiting example, a user issues a voice command to change the temperature in the physical area 105 by a given measure (e.g., reduce the temperature two degrees). In the physical area 105, this voice command is received by three IoT devices: the second IoT device 125, the third IoT device 130, and the fourth IoT device 135. The fourth IoT device 135 is an environmental control device, but based on the interconnectivity of the IoT devices, through the IoT, any IoT device with voice command input capability may be capable of receiving a voice command related to physical area 105 temperature and relaying this command to an IoT device (e.g., the fourth IoT device 135) capable of adjusting the temperature in accordance with the command. However, if the fourth IoT device 135 receives this command and it also receives duplicative requests from the second IoT device 125 and the third IoT device 130, the efficiency of the environment is compromised. The duplicative commands may also trigger security concerns within the home network of the physical environment 100, causing a security program to disable one or more of the IoT devices, or at least take the devices out of listening mode.

In some embodiments of the present invention, the program code 185 executing on the one or more resources 180 obtains the requests from all devices 125 130 135 in receipt of the command and the program code 185, buffering for a time period in order to ensure that all duplicates are received, and issues a single command to the fourth IoT device 135 to adjust the temperature in accordance with the specifications in the voice command. In this example, the program code 185 executing on the one or more resources 180 buffers the commands/requests "heard" by the IoT devices 125 130 135, so that rather than any device 125 130 135 or the one or more resources 180 executing the substance of the voice command immediately, after a delay that is not perceivable by the user (individual who issued the voice command), the command is executed a single time. The three requests flow to the one or more resources 180, but the one or more resources 180 send a single request to one IoT device (i.e., the fourth IoT device 135) to change the temperature.

Figure 2:
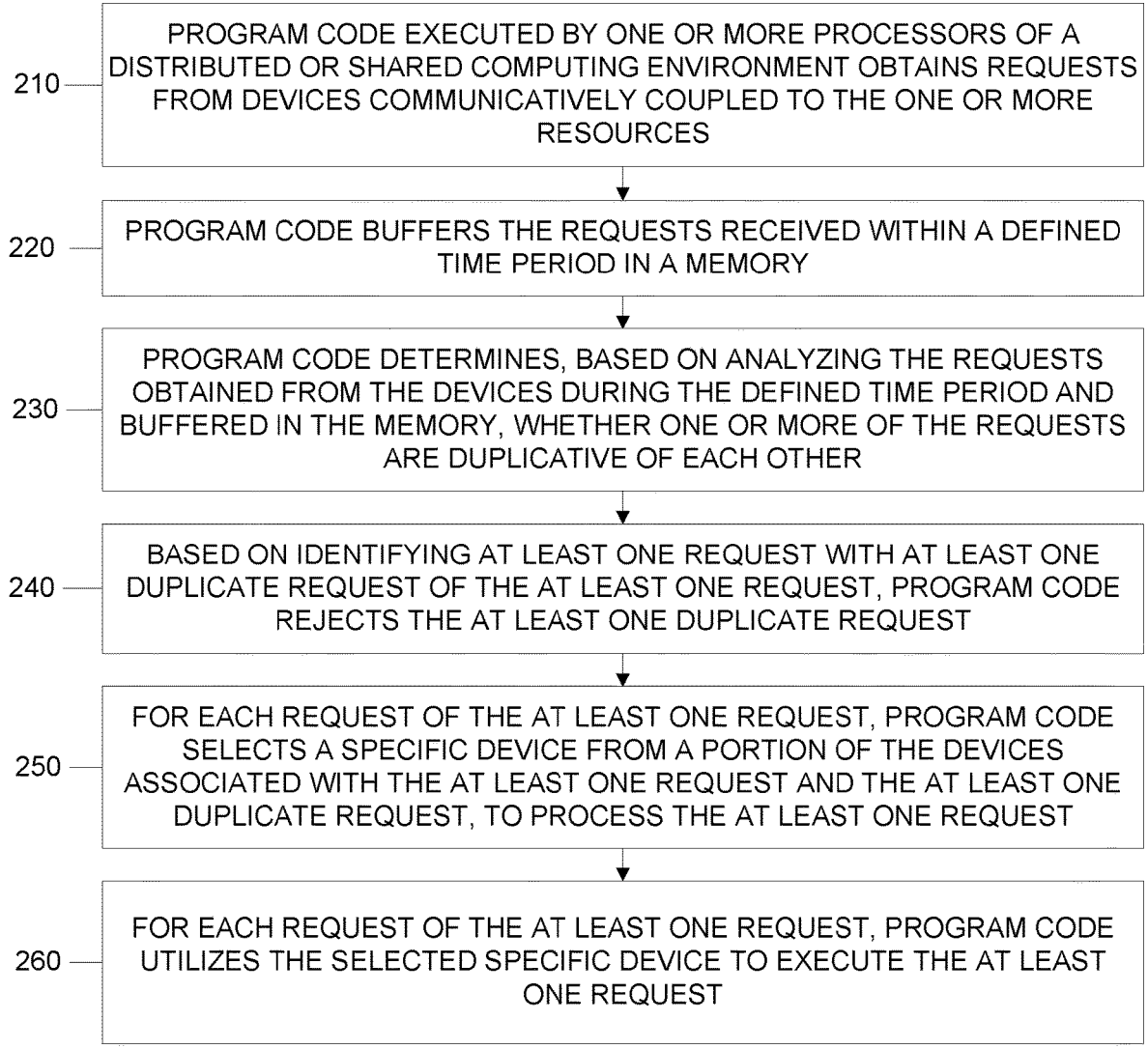
FIG. 2 is a workflow illustrating certain aspects of an embodiment of the present invention.

FIG. 2 is a workflow 200 that illustrates certain aspects of some embodiments of the present invention. Throughout this workflow 200, for illustrative purposes only, reference will be made to various elements of the physical area 105 of FIG. 1. The use of these elements to illustrate the workflow 200 are offered for ease of understanding and are not meant to introduce any technical limitations.

Returning to FIG. 2, in some embodiments of the present invention, program code 185 (FIG. 1) executed by one or more processors of the one or more resources 180 (FIG. 1) of a distributed or shared computing environment, including but not limited to, a cloud computing environment, obtains requests from devices (e.g., IoT devices) communicatively coupled to the one or more resources 180 (210). In some embodiments of the present invention, the requests relayed to the program code 185 by the devices (e.g., FIG. 1, 120, 125, 130, 135) originate from a voice command issued within a range of the devices, where the devices were able to receive this voice command and determine the underlying (processing) request of the voice command.

The program code 185 (FIG. 1) buffers the requests received within a defined time period in a memory accessible to and/or internal to the one or more resources 180 (220). In some embodiments of the present invention, the memory may be a common resource of the distributed or shared computing environment. The defined amount of time may be a configurable setting, but the delay caused by the buffering should not be so long as to be experienced as an unexpected delay by the user who issued the voice command resulting in the requests.

The program code 185 (FIG. 1) determines, based on analyzing the requests obtained from the devices during the defined time period and buffered in the memory, whether one or more of the requests are duplicative of each other (230). Based on identifying at least one request with at least one duplicate request of the at least one request, the program code 185 (FIG. 1), rejects (e.g., deletes from the memory, otherwise removes from the memory) the at least one duplicate request (240). In some embodiments of the present invention, the program code identifies originating devices for the at least one request and the at least one duplicate request. For each request of the at least one request, the program code selects a specific device from a portion of the devices associated with the at least one request and the at least one duplicate request, to process the at least one request (250). For each request of the at least one request, the program code utilizes the selected specific device to execute the at least one request (260).

In some embodiments of the present invention, the program code 185 (FIG. 1) may accumulate, in the buffer, certain requests for which there are no duplicates. In this situation, the program code 185 will execute the request utilizing the device from which the request originated.

Figure 3:
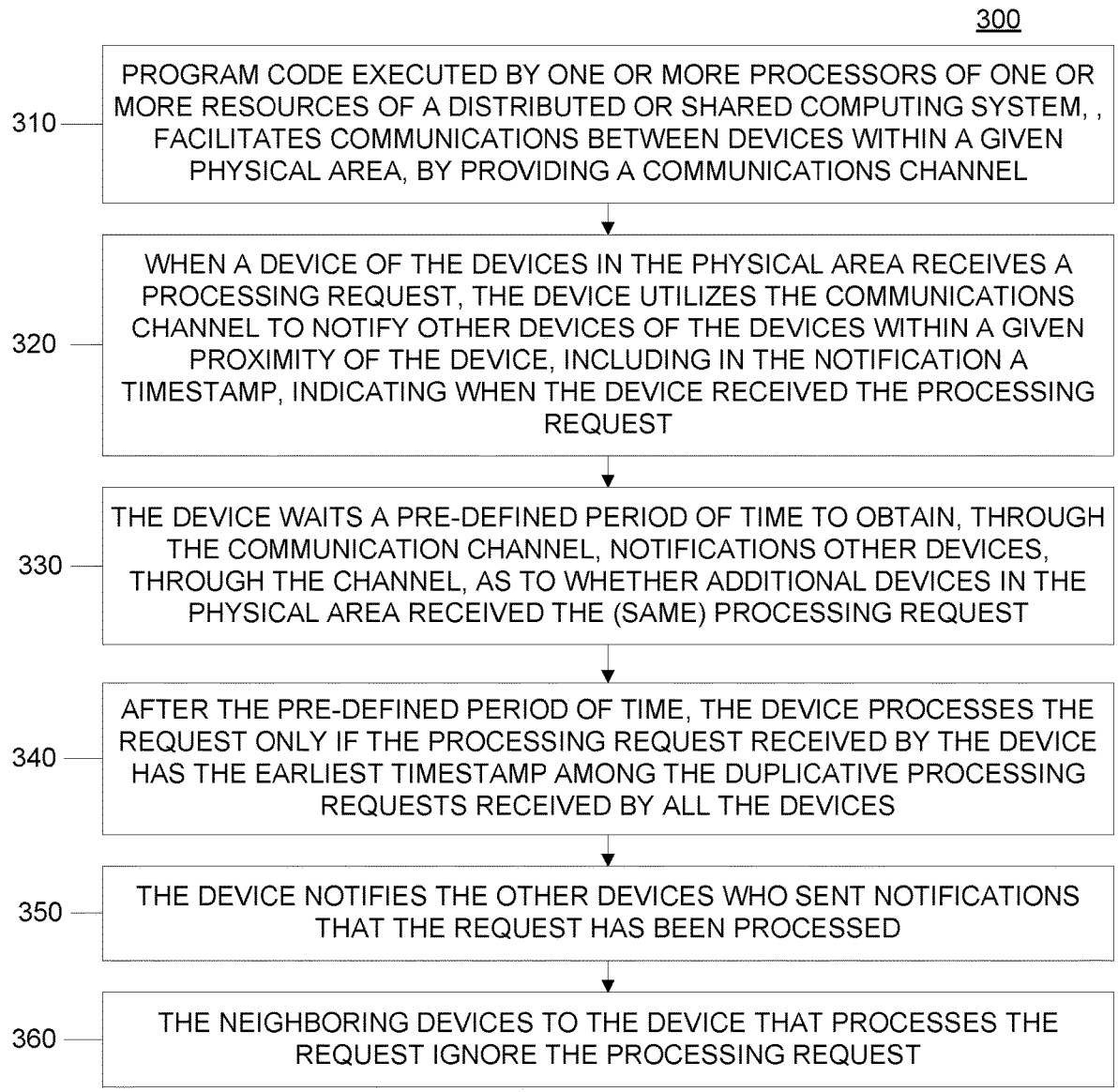
FIG. 3 is a workflow illustrating certain aspects of an embodiment of the present invention.

FIG. 3 is a workflow 300 illustrating certain aspects of some embodiments of the present invention. FIG. 3 illustrates aspects of an embodiments of the present invention where the program code 185 (FIG. 1) manages handshakes between the devices (e.g., IoT devices 120 125 130 135, FIG. 1) (i.e., peer-to-peer handshakes) and program code executing on the devices determines, based on the timestamps associated with duplicates of the same request received by the devices, which device will execute the request. The device that executes the requests notifies the other devices in receipt of the request as to the request being processed, enabling each device to validate the execution of the request. Like FIG. 2, in describing FIG. 3, references will be made to various elements of FIG. 1, for illustrative purposes, only. In FIG. 3, although duplicate commands are handled utilizing program code 185 (FIG. 1) executed by one or more processors of one or more resources 180 (FIG. 1) of a distributed or shared computing system, such as a cloud computing system, in this workflow 300, the program code 185 (FIG. 1) manages a handshake that is performed between devices (e.g., IoT devices 120 125 130 135, FIG. 1) communicatively coupled to the one or more resources 180.

Returning to FIG. 3, in some embodiments of the present invention, the program code 185 (FIG. 1) executed by one or more processors of one or more resources 180 (FIG. 1) of a distributed or shared computing system, such as a cloud computing system, facilitates communications between devices (e.g., FIG. 1, 120, 125, 130, 135) communicatively coupled to one or more resources 180 (FIG. 1) and within a given physical area 105 (FIG. 1), by providing a communications channel (310). When a device of the devices in the physical area 105 (FIG. 1) receives a processing request (e.g., based on obtaining a voice command), the device utilizes the communications channel to notify other devices of the devices within a given proximity of the device (e.g., within a physical area 105, FIG. 1), including in the notification a timestamp, indicating when the device received the processing request (320). In some embodiments of the present invention, the device may communicate this notification to other devices utilizing communication methods including, but not limited to, Bluetooth, WiFi and near field communication (NFC). Thus, each device in a given physical area 105 (FIG. 1) will utilize the communication channel to notify other devices within a proximity (of which the physical area 105, FIG. 1, is an example) when the device receives a request. The proximity may be limited to a smaller portion of the physical area, such that neighboring devices notify each other of commands they receive.

Returning to FIG. 3, the device waits a pre-defined period of time to obtain, through the communication channel, notifications other devices, through the channel, as to whether additional devices in the physical area 105 (FIG. 1) received the (same) processing request (330). After the pre-defined period of time, the device processes the request only if the processing request received by the device has the earliest timestamp among the duplicative processing requests received by all the devices (340). The device notifies the other devices who sent notifications that the request has been processed (350). The devices who received the same processing request do not execute the processing request. Thus, the neighboring devices to the device that processes the request may ignore the processing request (360).

Embodiments of the present invention include a computer-implemented method, a computer program product, and a computer system, that include program code executed on one or more processors that continuously obtains from devices in a group of devices within a defined geographic proximity to each other, where the devices are communicatively coupled to the one or more processors, processing requests, where each of the processing requests is a result of a device in the group of devices receiving and interpreting a voice command issued within a geographic area comprising the group of devices. The program code buffers, in a memory resource communicatively coupled to the one or more processors, a portion of the processing requests obtained by the one or more processors, where the portion was obtained within a defined time interval. The program code determines, based on analyzing each processing request in the portion, whether one or more processing requests in the portion are duplicative of each other. Based on determining that the portion comprises one or more processing requests and one or more duplicate processing requests of the one or more processing requests, the program code rejects the one or more duplicate processing requests. For each processing request of the one or more processing requests, the program code selects, from a sub-set of the devices, where the subset-set comprises devices in the group that originated processing requests comprising the portion, a specific device to execute the processing request. For each request of the one or more processing requests, the program code utilizes the specific device to execute the processing request.

In some embodiments of the present invention, one or more of the devices in the group of devices are Internet of Things devices.

In some embodiments of the present invention, the processing requests comprise timestamps, and selecting the specific device to execute the processing request comprises: for each request of the one or more processing requests, the program code compares timestamps associated with the processing request and the one or more duplicate processing requests, to identify an earliest timestamp. The program code selects the specific device to execute the processing request, where a processing request of the processing request and the one or more duplicate processing requests obtained by the one or more processors and originating from the specific device, comprises the earliest timestamp.

In some embodiments of the present invention, when selecting the specific device to execute the processing request, for each request of the one or more processing requests, the program code analyzes content of the processing request and selects the specific device based on the content.

In some embodiments of the present invention, the program code rejects the one or more duplicate processing requests by deleting the one or more duplicate processing requests.

In some embodiments of the present invention, the program code rejects the one or more duplicate processing requests by transmitting an instruction to the devices in the group that originated processing requests excluding the specific device, to cancel execution of the processing request.

In some embodiments of the present invention, for each processing request, the program code obtains a confirmation from the specific device that execution of the processing request is complete. The program code transmits the confirmation to the devices in the group that originated processing requests excluding the specific device, where upon receipt of the confirmation, the devices in the group that originated processing requests, excluding the specific device, cancel execution of the processing request.

In some embodiments of the present invention, the program code utilizes the specific device to execute the processing request also by transmitting an instruction to the specific device, wherein upon receipt of the instruction, the specific device executed the processing request.

In some embodiments of the present invention, the program code utilizes the specific device to execute the processing request also by executing the processing request utilizing one or more computing resources of the specific device.

In some embodiments of the present invention, the program code establishes a communication channel between the devices in the group of devices. The program code obtains a notification from a first device is the group of devices that the first device received a voice command. The program code notifies the devices in the group of devices excluding the first device, that the first device received the voice command.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, computing resource(s) 180 (FIG. 1) can each be understood as a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
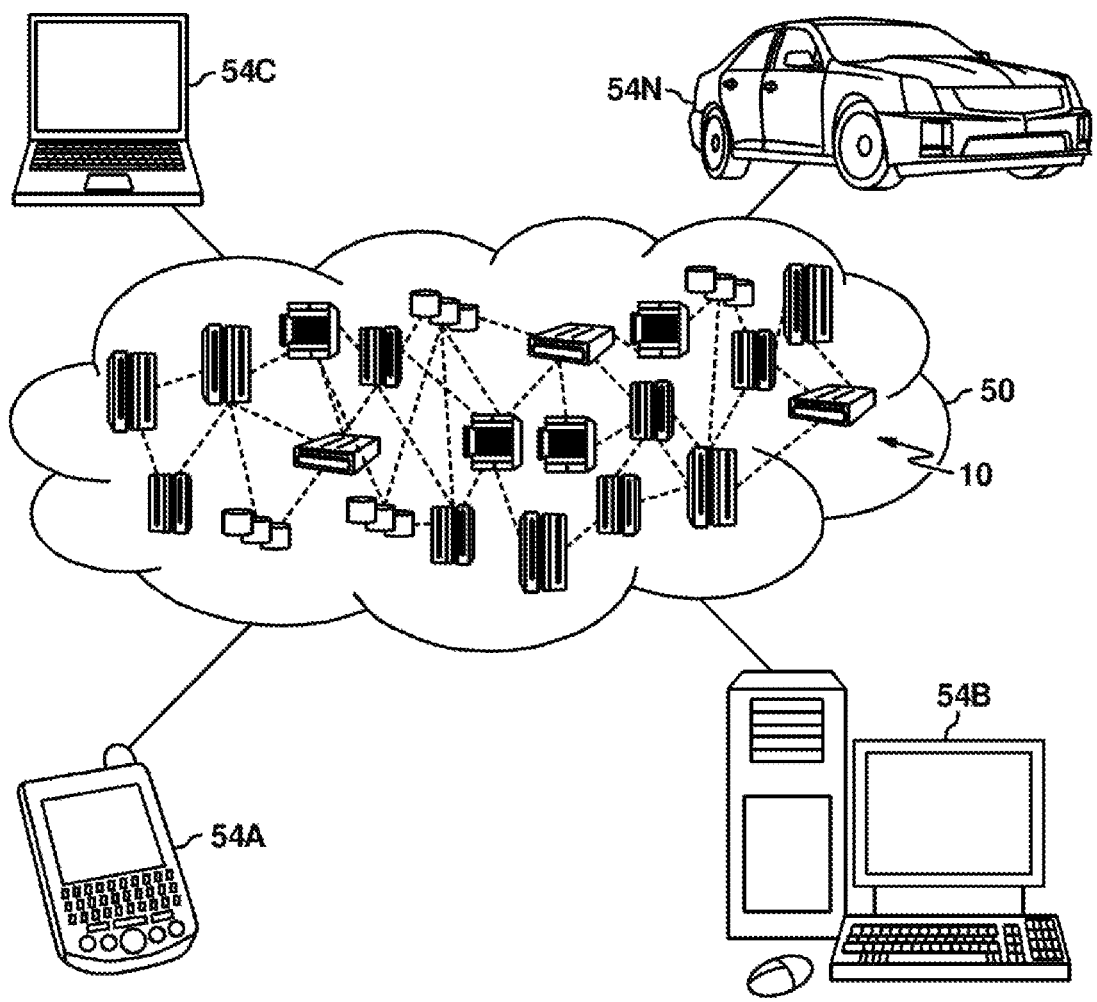
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
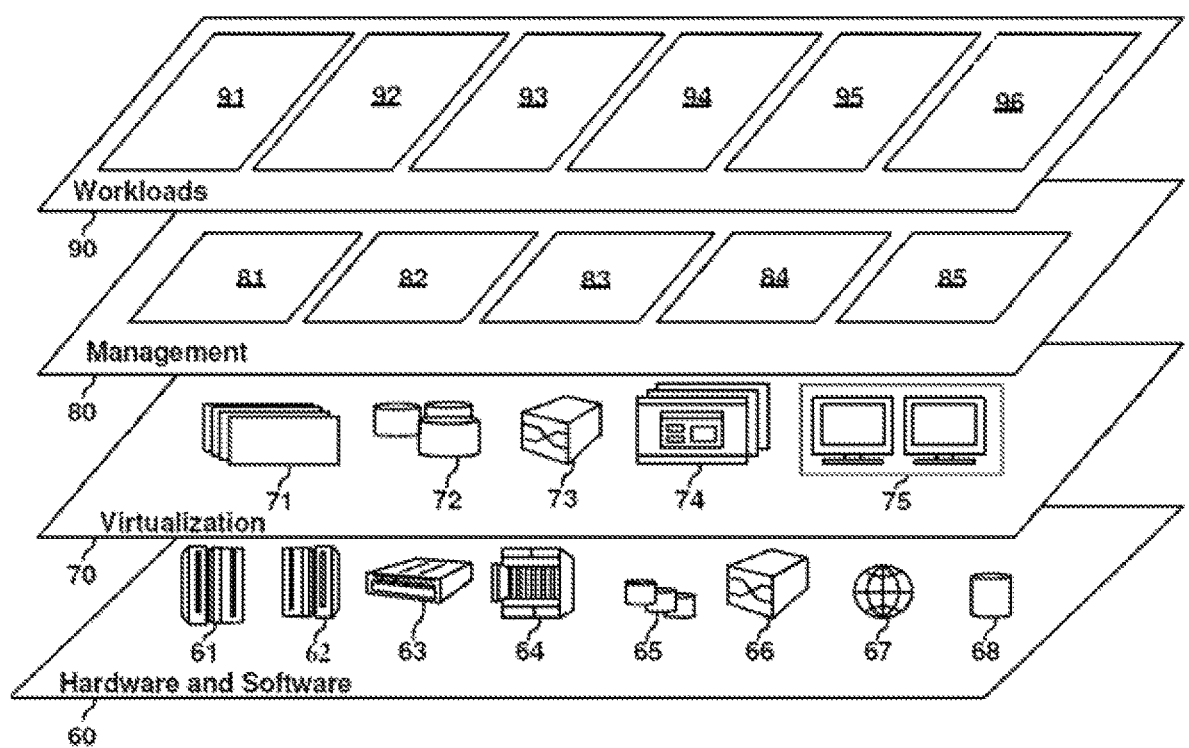
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing a disambiguation of cognitive agents, such as IoT devices 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining at a given time, by one or more processors of a given device, wherein the given device is from devices in a dynamic group of devices within a defined geographic proximity to each other at the given time, a processing request, wherein the processing request is a result of the given device receiving and interpreting a voice command issued within a geographic area comprising the group of devices;
   establishing, by the one or more processors, a communication channel between the devices in the group of devices;
   notifying, by the one or more processors, via the communication channel, the devices in the group of devices excluding the given device, that given device obtained the processing request, wherein the notifying includes providing a timestamp indicating when the given device received the processing request, wherein the notifying comprises a request to the devices in the group of devices excluding the given device for similar processing requests, wherein the similar processing requests comprise results of one or more of the devices in the group of devices excluding the given devices receiving and interpreting the voice command, wherein based on obtaining the request, the one or more devices transmit one or more notifications to the given device, via the communications channel, wherein the one or more notifications each comprise timestamps indicating when each device of the one or more devices received a similar processing request of the similar processing requests;
   pausing, by the one or more processors, executing the processing request for a pre- defined period of time to obtain, through the communication channel, the one or more notifications from the one or more devices;
   analyzing each similar processing request, to determine whether any request among the processing request and the similar processing requests are duplicative of each other, wherein the analyzing comprises comparing the timestamp of the processing request with the timestamps of the similar processing requests; and
   based on determining that the processing request and the similar processing requests are duplicative of each other and that the timestamp of the processing request is an earlier timestamp than the timestamps of the similar processing requests, selecting, by the one or more processors, a specific device from the dynamic group of devices to execute the processing request.

2. The computer-implemented of claim 1, wherein one or more of the devices in the group of devices comprise Internet of Things devices.

3. The computer-implemented of claim 1, wherein selecting the specific device to execute the processing request comprises:
   analyzing, by the one or more processors, content of the processing request; and
   selecting the specific device based on the content.

4. The computer-implemented method of claim 1 further comprising:
   based on determining that the processing request and the similar processing requests are duplicative of each other, rejecting, by the or more processors, the similar processing requests, wherein rejecting the similar processing requests comprises deleting the similar processing requests.

5. The computer-implemented method of claim 1, wherein rejecting the similar processing requests comprises:
   transmitting, by the one or more processors, an instruction to the devices in the group that originated processing requests excluding the specific device, to cancel execution of the processing request.

6. The computer-implemented method of claim 1, further comprising:
   for the processing request, obtaining, by the one or more processors, a confirmation from the specific device that execution of the processing request is complete; and
   transmitting, by the one or more processors, the confirmation to the devices in the group that originated the similar processing requests excluding the specific device, wherein upon receipt of the confirmation, the devices in the group that originated the similar processing requests excluding the specific device cancel execution of the similar processing request.

7. The computer-implemented method of claim 1, wherein utilizing the specific device to execute the processing request further comprises:
   transmitting, by the one or more processors, an instruction to the specific device, wherein upon receipt of the instruction, the specific device executes the processing request.

8. The computer-implemented method of claim 1, wherein utilizing the specific device to execute the processing request further comprises:

executing, by the one or more processors, the processing request utilizing one or more computing resources of the specific device.

9. The computer-implemented method of claim 1, wherein the specific device is the given device.

10. A computer program product comprising:
a computer readable storage medium readable by one or more processors and storing instructions for execution by the one or more processors for performing a method comprising:
obtaining at a given time, by the one or more processors, wherein the one or more processors are one or more processors of a given device, wherein the given device is from devices in a dynamic group of devices within a defined geographic proximity to each other at the given time, a processing request, wherein the processing request is a result of the given device receiving and interpreting a voice command issued within a geographic area comprising the group of devices;
establishing, by the one or more processors, a communication channel between the devices in the group of devices;
notifying, by the one or more processors, via the communication channel, the devices in the group of devices excluding the given device, that given device obtained the processing request, wherein the notifying includes providing a timestamp indicating when the given device received the processing request, wherein the notifying comprises a request to the devices in the group of devices excluding the given device for similar processing requests, wherein the similar processing requests comprise results of one or more of the devices in the group of devices excluding the given devices receiving and interpreting the voice command, wherein based on obtaining the request, the one or more devices transmit one or more notifications to the given device, via the communications channel, wherein the one or more notifications each comprise timestamps indicating when each device of the one or more devices received a similar processing request of the similar processing requests;
pausing, by the one or more processors, executing the processing request for a pre-defined period of time to obtain, through the communication channel, the one or more notifications from the one or more devices;
analyzing each similar processing request, to determine whether any request among the processing request and the similar processing requests are duplicative of each other, wherein the analyzing comprises comparing the timestamp of the processing request with the timestamps of the similar processing requests; and
based on determining that the processing request and the similar processing requests are duplicative of each other and that the timestamp of the processing request is an earlier timestamp than the timestamps of the similar processing requests, selecting, by the one or more processors, a specific device from the dynamic group of devices to execute the processing request.

11. The computer program product of claim 10, wherein one or more of the devices in the group of devices comprise Internet of Things devices.

12. The computer program product of claim 10, wherein selecting the specific device to execute the processing request comprises:
analyzing, by the one or more processors, content of the processing request; and
selecting the specific device based on the content.

13. The computer program product of claim 10, further comprising:
based on determining that the processing request and the similar processing requests are duplicative of each other, rejecting, by the or more processors, the similar processing requests, wherein rejecting the similar processing requests comprises deleting the similar processing requests.

14. The computer program product of claim 10, wherein rejecting the similar processing requests comprises:
transmitting, by the one or more processors, an instruction to the devices in the group that originated processing requests excluding the specific device, to cancel execution of the processing request.

15. The computer program product of claim 10, the method, further comprising:
for the processing request, obtaining, by the one or more processors, a confirmation from the specific device that execution of the processing request is complete; and
transmitting, by the one or more processors, the confirmation to the devices in the group that originated the similar processing requests excluding the specific device, wherein upon receipt of the confirmation, the devices in the group that originated the similar processing requests excluding the specific device cancel execution of the similar processing request.

16. The computer program product of claim 10 wherein utilizing the specific device to execute the processing request further comprises:
transmitting, by the one or more processors, an instruction to the specific device, wherein upon receipt of the instruction, the specific device executes the processing request.

17. The computer program product of claim 10, wherein utilizing the specific device to execute the processing request further comprises:
executing, by the one or more processors, the processing request utilizing one or more computing resources of the specific device.

18. The computer program product of claim 10, wherein the specific device is the given device.

19. A system comprising:
a memory;
one or more processors in communication with the memory;
program instructions executable by the one or more processors via the memory to perform a method, the method comprising:
obtaining at a given time, by the one or more processors, wherein the one or more processors are one or more processors of a given device, wherein the given device is from devices in a dynamic group of devices within a defined geographic proximity to each other at the given time, a processing request, wherein the processing request is a result of the given device receiving and interpreting a voice command issued within a geographic area comprising the group of devices;
establishing, by the one or more processors, a communication channel between the devices in the group of devices;
notifying, by the one or more processors, via the communication channel, the devices in the group of devices excluding the given device, that given device obtained the processing request, wherein the notifying includes providing a timestamp indicating when the given device received the processing request, wherein the notifying comprises a request to the devices in the group of devices excluding the given device for similar processing requests, wherein the similar processing requests comprise results of one or more of the devices in the group of devices excluding the given devices receiving and interpreting the voice command, wherein based on obtaining the request, the one or more devices transmit one or more notifications to the given device, via the communications channel, wherein the one or more notifications each comprise timestamps indicating when each device of the one or more devices received a similar processing request of the similar processing requests;

pausing, by the one or more processors, executing the processing request for a pre-defined period of time to obtain, through the communication channel, the one or more notifications from the one or more devices;

analyzing each similar processing request, to determine whether any request among the processing request and the similar processing requests are duplicative of each other, wherein the analyzing comprises comparing the timestamp of the processing request with the timestamps of the similar processing requests; and based on determining that the processing request and the similar processing requests are duplicative of each other and that the timestamp of the processing request is an earlier timestamp than the timestamps of the similar processing requests, selecting, by the one or more processors, a specific device from the dynamic group of devices to execute the processing request.

20. The system of claim 19, wherein the specific device is the given device.

* * * * *